United States Patent [19]

Ueda et al.

[11] Patent Number: 4,642,503
[45] Date of Patent: Feb. 10, 1987

[54] ROTOR FOR A SUPERCONDUCTING ROTATING ELECTRIC MACHINE

[75] Inventors: Akinori Ueda; Kouichi Okamoto, both of Kobe, Japan

[73] Assignee: Mitsubishi Denki Kabushiki Kaisha, Tokyo, Japan

[21] Appl. No.: 751,899

[22] Filed: Jul. 5, 1985

[30] Foreign Application Priority Data

Jul. 5, 1984 [JP] Japan .................. 59-140796
Jul. 5, 1984 [JP] Japan .................. 59-140799
Jul. 5, 1984 [JP] Japan .................. 59-140802
Jul. 5, 1984 [JP] Japan .................. 59-140803
Jul. 5, 1984 [JP] Japan .................. 59-140805
Jul. 5, 1984 [JP] Japan .................. 59-140807

[51] Int. Cl.$^4$ .............................. H02K 3/48
[52] U.S. Cl. .................... 310/214; 310/52; 310/208; 310/261
[58] Field of Search ............. 310/214, 215, 10, 52, 310/61, 64, 65, 208, 261

[56] References Cited

U.S. PATENT DOCUMENTS

| 4,074,161 | 2/1978 | Minichev | 310/214 |
| 4,329,602 | 5/1982 | Gillet | 310/52 |
| 4,385,248 | 5/1983 | Laskaris | 310/214 |
| 4,439,701 | 3/1984 | Okamoto | 310/52 |

FOREIGN PATENT DOCUMENTS

| 976105 | 2/1963 | Fed. Rep. of Germany . | |
| 2028767 | 3/1971 | Fed. Rep. of Germany | 310/214 |
| 2233508 | 1/1973 | Fed. Rep. of Germany . | |
| 2262045 | 7/1973 | Fed. Rep. of Germany . | |
| 2519134 | 4/1978 | Fed. Rep. of Germany . | |
| 2905639 | 8/1979 | Fed. Rep. of Germany . | |
| 2804654 | 8/1979 | Fed. Rep. of Germany . | |
| 2854059 | 7/1980 | Fed. Rep. of Germany . | |
| 3212197 | 11/1982 | Fed. Rep. of Germany . | |
| 3220270 | 6/1983 | Fed. Rep. of Germany . | |
| 2050535 | 4/1971 | France . | |
| 57-166839 | 10/1982 | Japan . | |
| 57-208858 | 12/1982 | Japan . | |
| 2100527 | 12/1982 | United Kingdom . | |
| 2099231 | 12/1982 | United Kingdom . | |

OTHER PUBLICATIONS

Werkstoffe Nichteisenmetalle.

*Primary Examiner*—R. Skudy
*Attorney, Agent, or Firm*—Leydig, Voit & Mayer

[57] ABSTRACT

A rotor for a superconducting rotating electric machine comprises a cylindrical coil-carrying shaft in which are formed a plurality of parallel coil slots. In the teeth of the shaft adjoining the corners and the arcuate portions of the slots, recesses are formed, and movement prevention means comprising retaining plates, support members, and retaining members which prevent the movement of the wedges and coils in the adjoining coil slots are secured in the recesses by bolts or the like. The provision of the recesses makes it possible to insert previously-wound field coils into the coil slots, and the movement prevention means prevents the movement of the wedges and the coils in the slots. As the movement prevention means is detachable, the inspection and repair of the field coils is facilitated.

23 Claims, 23 Drawing Figures

ROTOR FOR A SUPERCONDUCTING ROTATING ELECTRIC MACHINE

BACKGROUND OF THE INVENTION

The present invention relates to a rotor for a superconducting rotating electric machine. More particularly, it relates to a rotor for a superconducting rotating electric machine in which the superconducting field coils are more reliably secured to the rotor.

Due to the very high speeds of rotation of a rotor for a superconducting rotating electric machine, the superconducting field coils of such a rotor are subjected to very high centrifugal forces. Since any movement of the field coils may not only result in their damage but may generate frictional heat which can cause a loss of superconductivity, it is extremely important that the coils be rigidly secured to the rotor.

Japanese Laid Open Patent Application No. 57-166839 discloses a rotor for a superconducting rotating electric machine in which the straight, longitudinally-extending portions of field coils are housed in separate, longitudinally-extending slots formed in the rotor and are secured against centrifugal forces by slot wedges inserted into the slots above the coils, while the arcuate portions of the coils are all housed in a single wide circumferentially-extending slot machined in the rotor. The arcuate portions of the coils are separated from one another by electrically insulating packing, and a retaining ring is shrink-fit over the arcuate portions of the coils to secure them against centrifugal forces. However, the electrically insulating packing between the arcuate portions of the field coils has a coefficient of thermal expansion which is about twice as large as that of the rotor or the field coils. Therefore, while it is possible to rigidly secure the field coils in the slots at normal temperatures, when the rotor is cooled to extremely low temperatures during operation, gaps develop between the field coils and the electrically insulating packing. As the electrically insulating packing is not secured to the slots in the rotor, it is possible for the field coils to move, producing frictional heat which may cause a loss of superconductivity. Furthermore, the use of a retaining ring to secure the arcuate portions of the field coils makes it difficult to inspect and repair the coils at a later time, since the retaining ring is not readily detachable.

An alternative method of securing field coils to a rotor which has been used in the past is to house not only the longitudinally-extending portions of the field coils but also the arcuate portions of the coils in individual slots in the rotor. The arcuate portions of the field coils are held in the slots by wedges, just as are the longitudinally-extending portions. No electrically insulating packing is required between coils, nor is a retaining ring necessary, and thus inspection and repair are made easier. However, with this method, it is impossible to install a previously-wound field coil into the slots in the rotor. Rather, the field coils must be wound inside the slots, which makes their installation extremely time-consuming and expensive.

SUMMARY OF THE INVENTION

It is an object of the present invention to provide a rotor for a superconducting rotating electric machine in which the field coils are reliably secured to the rotor at all temperatures.

It is another object of the present invention to provide a rotor for a superconducting rotating electric machine in which the field coils are reliably secured to the rotor without the use of a retaining ring over the arcuate portions of the coils.

It is a further object of the present invention to provide a rotor for a superconducting rotating electric machine in which previously-wound field coils can be easily installed in the rotor.

It is yet another object of the present invention to provide a rotor for a superconducting rotating electric machine which permits the field coils to be easily inspected and repaired.

According to the present invention, a rotor for a superconducting rotating electric machine comprises a coil-carrying shaft in which are formed a number of parallel coil slots, each slot having straight portions, arcuate portions, and corners connecting the straight portions and the arcuate portions. In the rotor teeth formed between adjacent slots, recesses are formed at least in the portions of the teeth adjacent to the corners of the slots, thereby enabling previously-wound coils to be inserted in the slots. The teeth have wedge grooves formed therein in which wedges are inserted to prevent the radial movement of field coils inserted into the coil slots. Retaining means comprising one or more members such as retaining plates and support members are detachably secured in the recesses by bolts or the like. The retaining means fit over the top edges of the wedges which fit in the coil slots and prevent their movement.

Additional objects and features of the invention will become clear from the following description in which the preferred embodiments have been set forth in detail in conjunction with the accompanying drawings.

BRIEF DESCRIPTION OF THE DRAWINGS

In the drawings, the same reference numerals indicate the same or corresponding parts.

DESCRIPTION OF THE PREFERRED EMBODIMENTS

Figure 1:
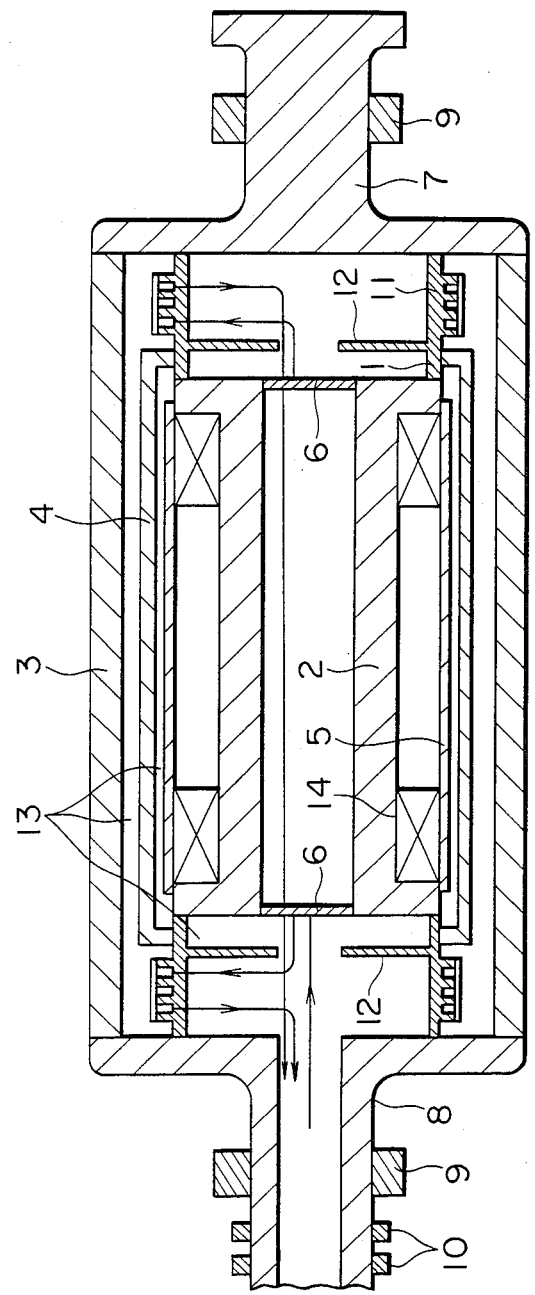
FIG. 1 is a longitudinal cross-sectional view of a rotor for a superconducting rotating electric machine of the type to which the present invention pertains.
Figure 2:
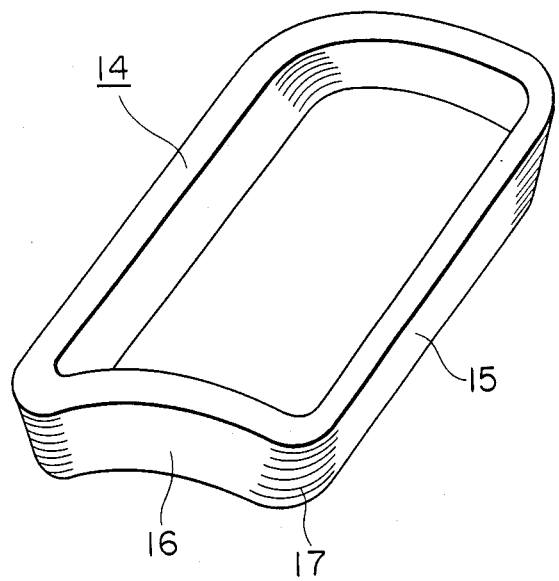
FIG. 2 is a perspective view of a superconducting field coil of the rotor of FIG. 1.

Hereinbelow, a number of preferred embodiments of the present invention will be described while referring to the accompanying drawings, of which FIG. 1 is a longitudinal cross-sectional view of a rotor of the type to which the present invention pertains, and FIG. 2 is a perspective view of one of the field coils of the rotor of FIG. 1. As can be seen from FIG. 1, the rotor has a cylindrical torque tube 1 in the middle of which is formed a coil-carrying shaft 2. The outer periphery of the rotor is defined by a cylindrical warm damper shield 3, which is rigidly secured at either end to an outboard shaft 7 and an inboard shaft 8, the inboard shaft 8 being connected to an unillustrated turbine or load, depending upon whether the rotor is used as part of a generator or a motor. Both of the shafts 7 and 8 are journaled in bearings 9. The inboard shaft 8 has slip rings 10 formed thereon by which current is supplied to superconducting field coils 14 mounted on the coil-carrying shaft 2. A cylindrical cold damper shield 4 is secured to the torque tube 1 between the coil-carrying shaft 2 and the warm damper shield 3. The damper shields 3 and 4 serve to shield the superconducting field coils 14 from alternating current magnetic fields, and also serve to damp low frequency oscillations of the rotor during disturbances of the electrical system to which the rotor is connected. Liquid helium, whose flow is indicated by the arrows, is supplied via unillustrated piping to the inner cavity of the coil-carrying shaft 2 and to heat exchangers 11 formed in or mounted on the torque tube 1. The inner cavity of the coil-carrying shaft 2 is hermetically sealed by an outer tube 5 secured to the outer periphery of the coil-carrying shaft 2 and by end plates 6 secured to the ends of the shaft 2 so that liquid helium introduced into the cavity will not spread to other parts of the rotor. Thermal radiation shields 12 which protect the field coils 14 from lateral radiation are mounted on the torque tube 1 at the ends of the coil-carrying shaft 2. The portions indicated by reference numeral 13 are evacuated.

As shown in FIG. 2, each of the superconducting field coils 14 comprises parallel straight portions 15, arcuate portions 16 formed at the ends of the straight portions 15, and corners 17 which connect the straight portions 15 and the arcuate portions 16. The straight portions 15 of the field coils 14 extend parallel to the axis of the coil-carrying shaft 2 in which it is housed while the arcuate portions 16 extend circumferentially over the coil-carrying shaft 2.

FIGS. 3 through 8 show a coil-carrying shaft 2 of a rotor according to a first embodiment of the present invention. The coil-carrying shaft 2 has a number of parallel coil slots 19 formed therein in which the field coils 14 are housed. Each of the coil slots 19 has longitudinally-extending straight portions 20, circumferentially-extending arcuate portions 21 at the ends of the straight portions 20, and corners 22 connecting the straight portions 20 and the arcuate portions 22. The coil slots 19 are separated from one another by rotor teeth 18 which extend radially outward from the longitudinal axis of the coilcarrying shaft 2. The teeth 18 have wedge grooves formed near their radial outer ends into which wedges 24 are inserted so as to restrain the coils 14 housed in the slots 19 against centrifugal forces.

Figure 3:
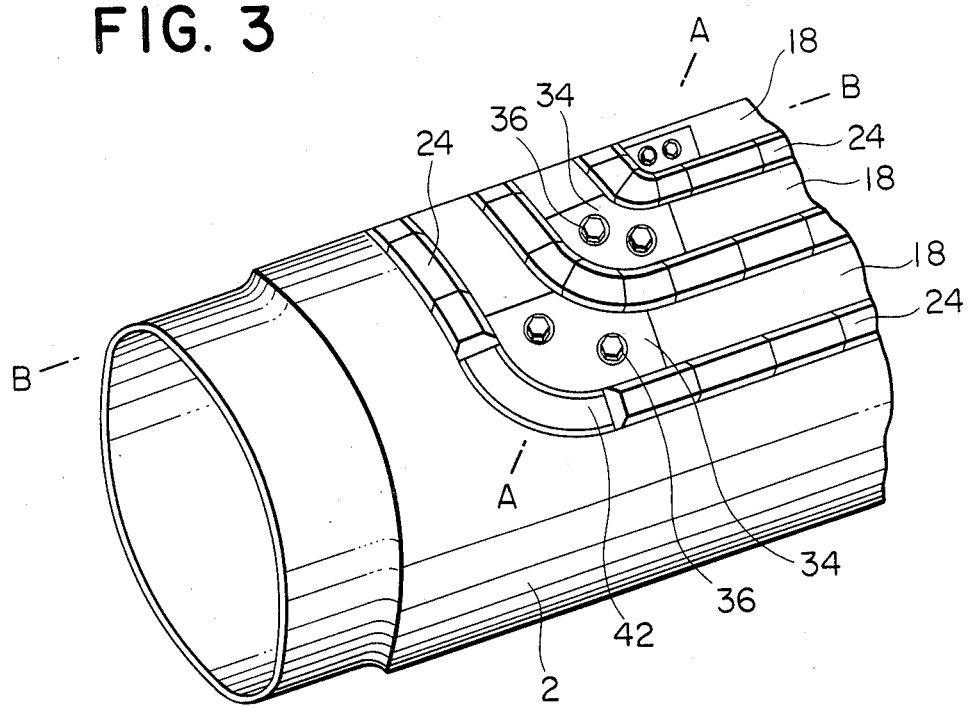
FIG. 3 is a perspective view of one end of a coil-carrying shaft of a rotor for a superconducting rotating electric machine according to a first embodiment of the present invention.
Figure 4:
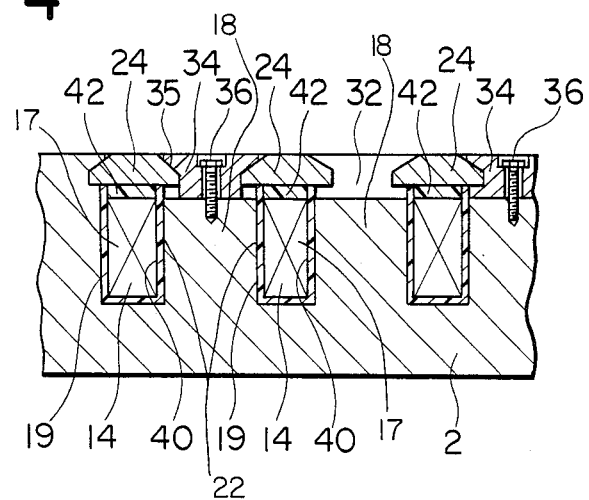
FIG. 4 is a cross-sectional view of the shaft of FIG. 3 taken along Line A—A.
Figure 5:
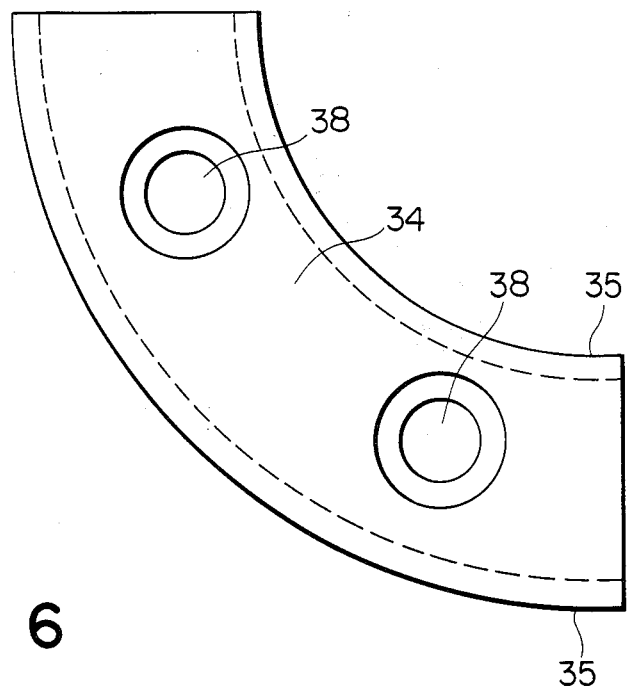
FIG. 5 is a plan view of one of the retaining plates illustrated in FIG. 3.
Figure 6:
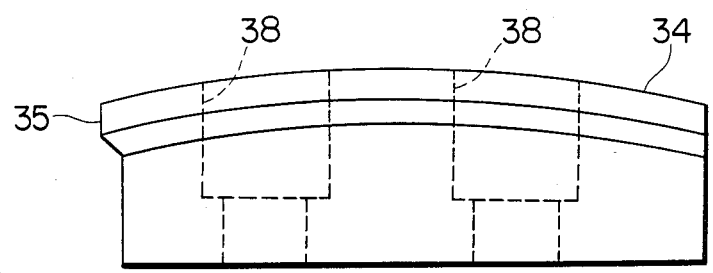
FIG. 6 is an elevation of the retaining plate of FIG. 5.

In the portions of the teeth 18 adjacent to the corners 22 of the slots, recesses 32 are cut which extend between adjacent coil slots 19. As shown in FIG. 4, which is a cross-sectional view of the shaft 2 of FIG. 3 taken along Line A—A, the recesses 32 have a depth less that that of the adjacent slots 19. In each of the recesses 32, means for preventing the movement of the wedges 24 in the adjacent coil slots 19 are provided. In this first embodiment, the means for preventing movement comprises retaining plates 34 which are detachably secured to the bottom surfaces of the recesses by bolts 36. (In order to better illustrate the structure, one of the retaining plates 34 shown in FIG. 3 has been omitted from FIG. 4.) The retaining plates 34 may be made from titanium or a titanium alloy. As shown in FIGS. 5 and 6, which are a plan view and an elevation of one of the retaining plates 34, the retaining plates 34 have a curved shape. This curved shape corresponds the shape of the rotor teeth 18 in the portions adjoining the corners 22 of the slots 19. The retaining plates 34 also have one or more countersunk bolt holes 38 formed therein through which the above-mentioned bolts 36 pass. The bolts 36 screw into unillustrated screw holes formed in the bottoms of the recesses 32. As shown best in FIG. 4, each of the retaining plates 34 has protruding portions 35 which extend along its length and fit over the edges of the wedges 24 in the adjoining slots 19, thereby preventing the wedges 24 from moving. The left side of the wedge 24 on the extreme lefthand side of FIG. 4 fits into a wedge groove, while its right side is restrained by a retaining plate 34. As for the other wedges 24 covering the corners 17 of the coils 14, both sides are restrained by retaining plates 34.

Figure 7:
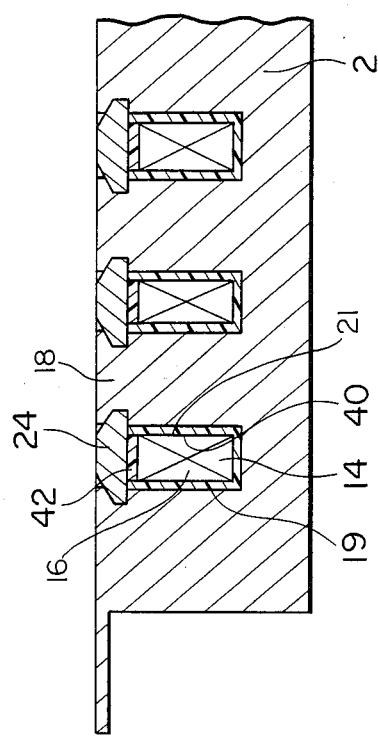
FIG. 7 is a cross-sectional view of the shaft of FIG. 3 taken along Line B—B.

In each portion of the slots 19, the superconducting field coils 14 are surrounded on the bottom and sides by inner electrical insulation 40 disposed between the coils 14 and the sides of the slots 19 and on top by wedge electrical insulation 42, over which wedges 24 are placed. In the straight portions 20 and the arcuate portions 21 of the slots 19, the coils 14 are held in place by wedges 24 which are inserted into wedge grooves formed in the top portions of the slots 19, and in the corner portions 22 are held in place by the wedges 24 in conjunction with the above-described retaining plates 34. FIG. 7 shows a cross-sectional view taken along Line B—B of FIG. 3, illustrating the manner in which the coils 14 are retained in the arcuate portions 21. The coils 14 are housed in the same manner in the straight portions 20 of the slots 19.

Figure 8:
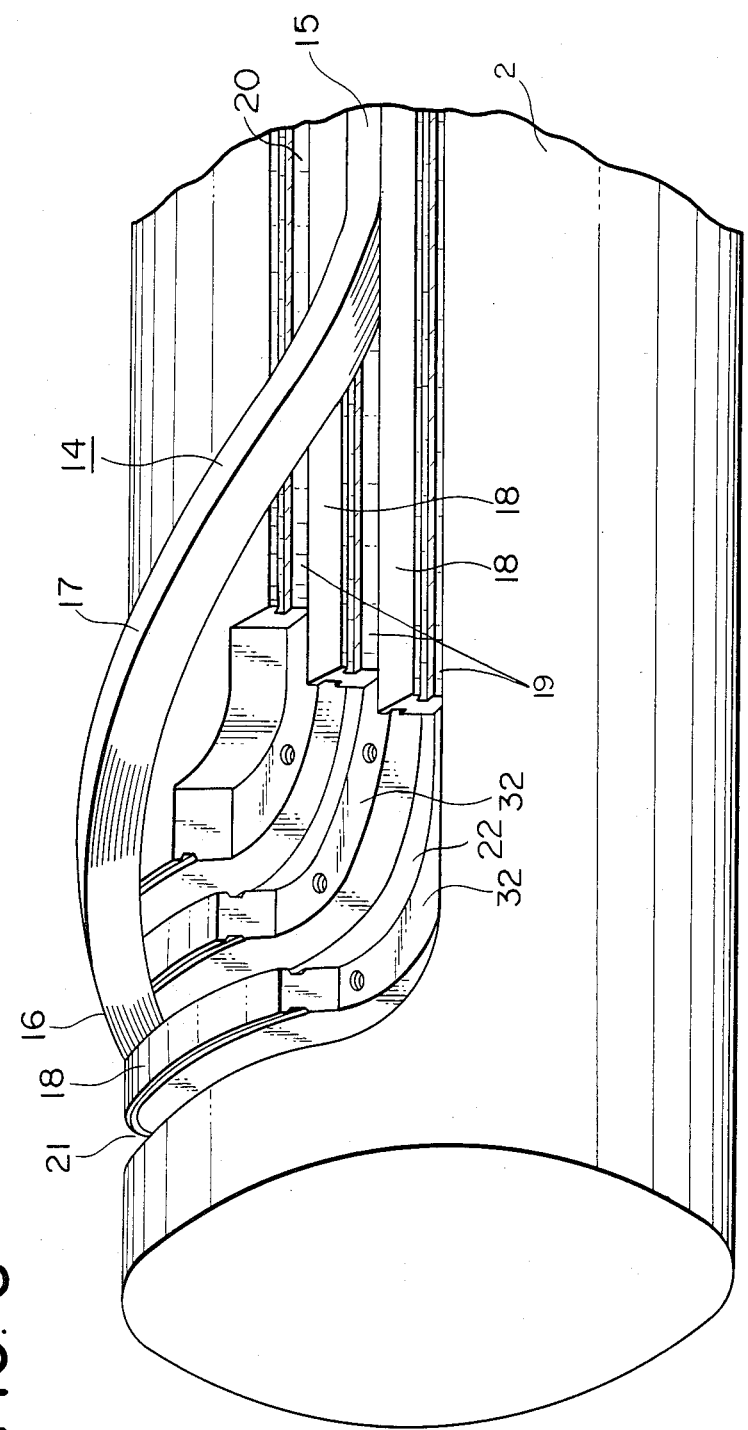
FIG. 8 is a perspective view of the shaft of FIG. 3, showing the manner in which field coils are inserted into the coil slots in the shaft.

FIG. 8 illustrates the manner in which a previously-wound field coil 14 is inserted into the slots 19 of the coil carrying-shaft 2 of FIG. 3. The straight portions 15 and the arcuate portions 16 of the coils 14 are first inserted into the corresponding portions of the slots 19, and then the corner 17 of each coil 14 is inserted into the corner 22 of the corresponding slot 19. The wedges 24 are then fit into the wedge grooves in the slots 19 so as to cover the coils 14, and the retaining plates 34 are secured to the recesses 32 by bolts 36 so as to restrain the wedges 24 in the corners 22 of the slots 19. It can be seen that because of the provision of the recesses 32, a previously-wound coil 14 can be easily housed in the coil-carrying shaft 2 and at the same time can be securely restrained against movement by the retaining plates 34. Furthermore, because there is no retaining ring and because the retaining plates 34 are detachably secured to the shaft 2, the inspection and repair of the field coils 14 after assembly is made much easier.

Figure 9:
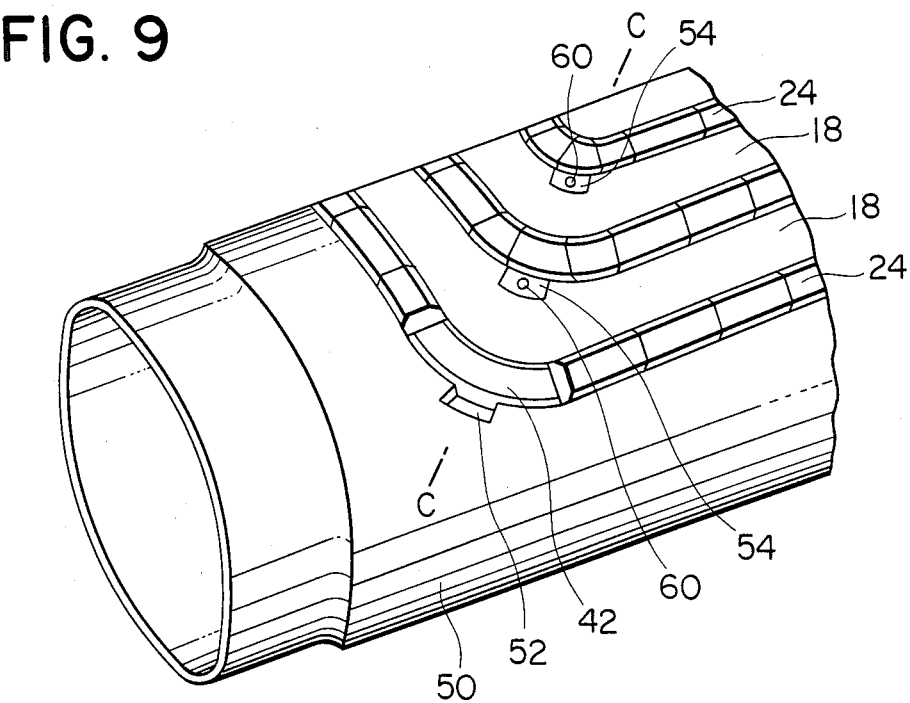
FIG. 9 is a perspective view of one end of a coil-carrying shaft of a rotor of a superconducting rotating electric machine according to a second embodiment of the present invention.
Figure 10:
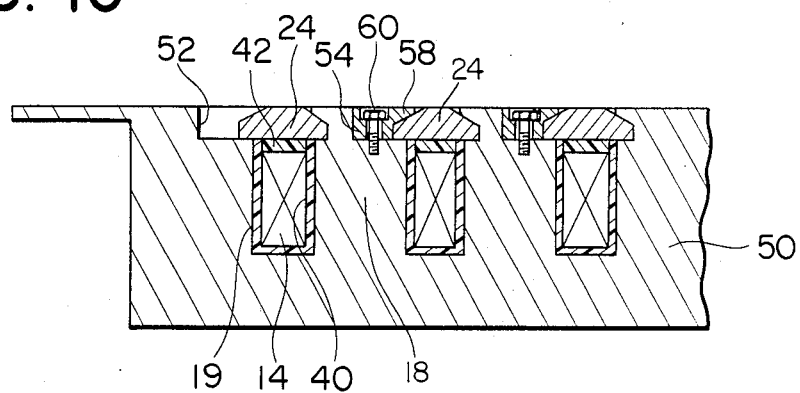
FIG. 10 is a cross-sectional view of the shaft of FIG. 9 taken along Line C—C.
Figure 11:
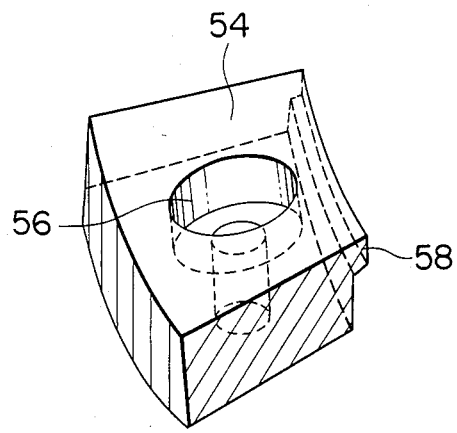
FIG. 11 is a perspective view of one of the retaining plates illustrated in FIG. 10.
Figure 12:
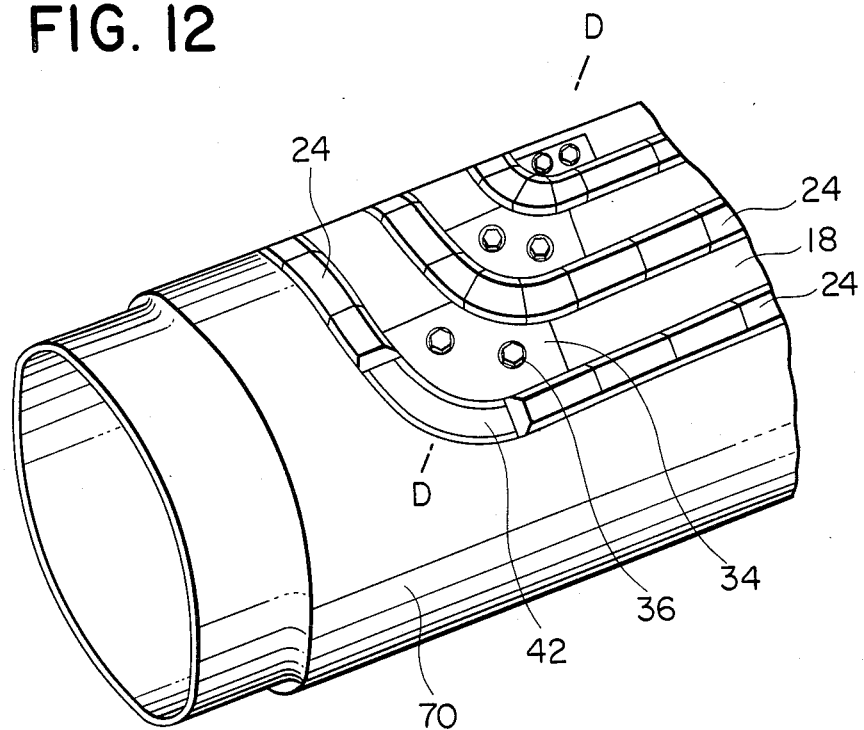
FIG. 12 is a perspective view of one end of a coil-carrying shaft of a rotor according to a third embodiment of the present invention.

FIGS. 9 and 10 show a coil-carrying shaft of a rotor according to a second embodiment of the present invention. As in the first embodiment, a coil-carrying shaft 50 has a plurality of parallel coil slots 19 formed in its surface, each coil slot 19 having straight portions, arcuate portions, and corners connecting the straight portions and the arcuate portions. Similarly, the straight portions of field coils are housed in the straight portions of the slots 19 and the arcuate portions of the coils 14 are housed in the arcuate portions of the slots 19 and are held in place by wedges 24 which fit into wedge grooves formed in the teeth 18 formed between the slots 19 a manner analogous to that illustrated in FIG. 7. Also, like the previous embodiment, recesses 52 are formed in the teeth 18 of the coil-carrying shaft 50 in the portions adjoining the corners of the slots 19. However, in this second embodiment, the recesses 52 are formed on only one side of each slot 19 on the side adjacent to the outside of the corner of each slot 19 and the recesses 52 do not extend between adjacent slots 19. Each recess 52 has a depth less than that of the adjoining slot 19, and a retaining plate 54 is rigidly secured to the bottom of each recess 52 by a bolt 60. The retaining plate 54 may be made from titanium or a titanium alloy. As shown in FIG. 11, each retaining plate 54 has a countersunk bolt hole 56 formed in it for a bolt, and a protruding portion 58 formed along one of its sides. As shown in FIG. 10, which is a cross-sectional view of the coil-carrying shaft 50 of FIG. 9 taken along Line C—C, when the bolts 60 are screwed into screw holes formed in the bottom surfaces of the recesses 52, the protruding portions 58 of the retaining plates 54 fit over one of the edges of a wedge 24 in the corresponding slot 19 and prevent the wedge 24 from moving. The opposite edge of each wedge 24 is held in a wedge groove formed in the portion of the teeth 18 confronting the recess 52. The installation of a field coil 14 in the coil-carrying shaft 50 is identical to that described with respect to the first embodiment.

As in the first embodiment, the provision of the recesses 52 in the teeth 18 adjacent to the corners of the slots 19 enables a previously-wound field coil 14 to be easily inserted into the slots 19, and the retaining plates 54 rigidly secure the wedges 24 and the coils 14 in the slots 19 and prevent their movement during operation of the rotor. Furthermore, as no retaining ring is required and the retaining plates 54 can be detached from the recesses 52 when necessary, the inspection and repair of the field coils 14 is facilitated.

Figure 13:
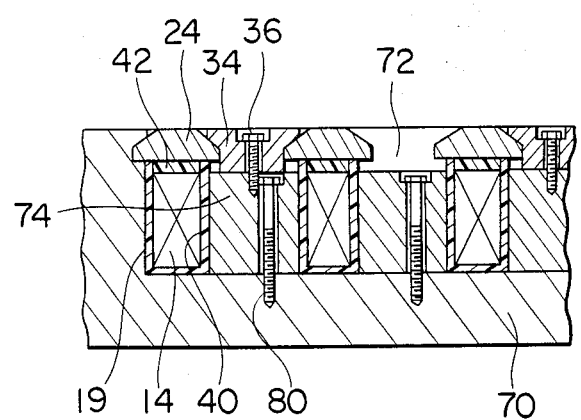
FIG. 13 is a cross-sectional view of the shaft of FIG. 12 taken along Line D—D.
Figure 14:
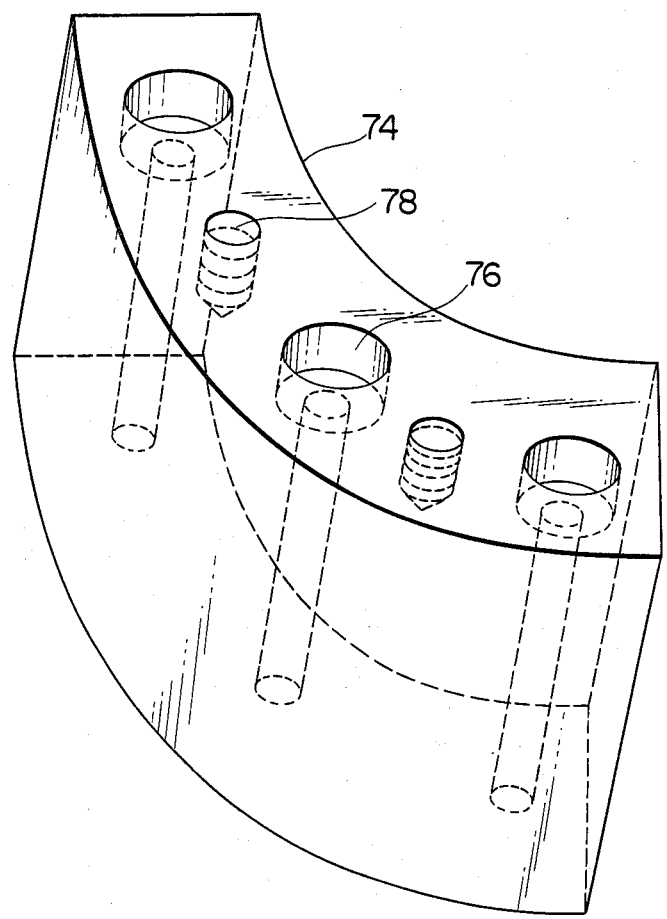
FIG. 14 is a perspective view of one of the support members illustrated in FIG. 13.

FIGS. 12 through 15 illustrate a coil-carrying shaft 70 of a rotor according to a third embodiment of the present invention. From the outside, this shaft 70 appears identical to the shaft 2 of FIG. 3, but as can be seen from FIG. 13, which is a cross-sectional view along Line D—D of FIG. 12, the recesses 72 which are formed in the teeth 18 of the shaft 70 adjacent to the corners of the slots 19 have a depth equal to the depth of the slots 19. The recesses 72 extend between adjacent slots 19. In this embodiment, the means for preventing movement of the wedges 24 and coils 14 comprise retaining plates 34 like those of FIGS. 5 and 6 and support members 74, one of which is illustrated in perspective in FIG. 14. The retaining plates 34 and support members 74 may be formed of titanium, a titanium alloy, or the same material as the coil-carrying shaft 70. The support members 74 are rigidly secured by bolts 80 to the bottom surfaces of the recesses 72, and the retaining plates 34 are secured to the top surfaces of the support members 74 by bolts 36. Each of the support members 74 has a number of countersunk bolt holes 76 through which the bolts 80 pass, and a number of screw holes 78 formed in its top surface into which the bolts 36 of the retaining plates 34 are screwed. The bolts 80 for the support members 74 screw into screw holes formed in the bottom surfaces of the recesses 72. Instead of using separate bolts for the retaining plates 34 and the support members 74, if the bolt holes 38 in the retaining plates 34 are aligned with the bolt holes 76 in the support members 74, a single long bolt can be used to secure the retaining plates 34 and the support members 74 to the recesses 72 and to each other at each location where a bolt is necessary. As shown in FIG. 13, the width of each support member 74 is made large enough to completely fill the space between adjacent coils 14, so that there will be no gaps between the support members 72 and the coils 14 and the coils 14 will be restrained from moving. In FIG. 13, in order to better illustrate the structure, one of the retaining plates 34 shown in FIG. 12 has been omitted.

It is desirable that the support members 74 be made of the same material as the coil-carrying shaft 70 or of a material having an identical coefficient of thermal expansion so that when the rotor is cooled to operating temperatures, the shaft 70 and the support member 74 will shrink at the same rate and no gaps will develop between the support members 74 and the coils 14.

Figure 15:
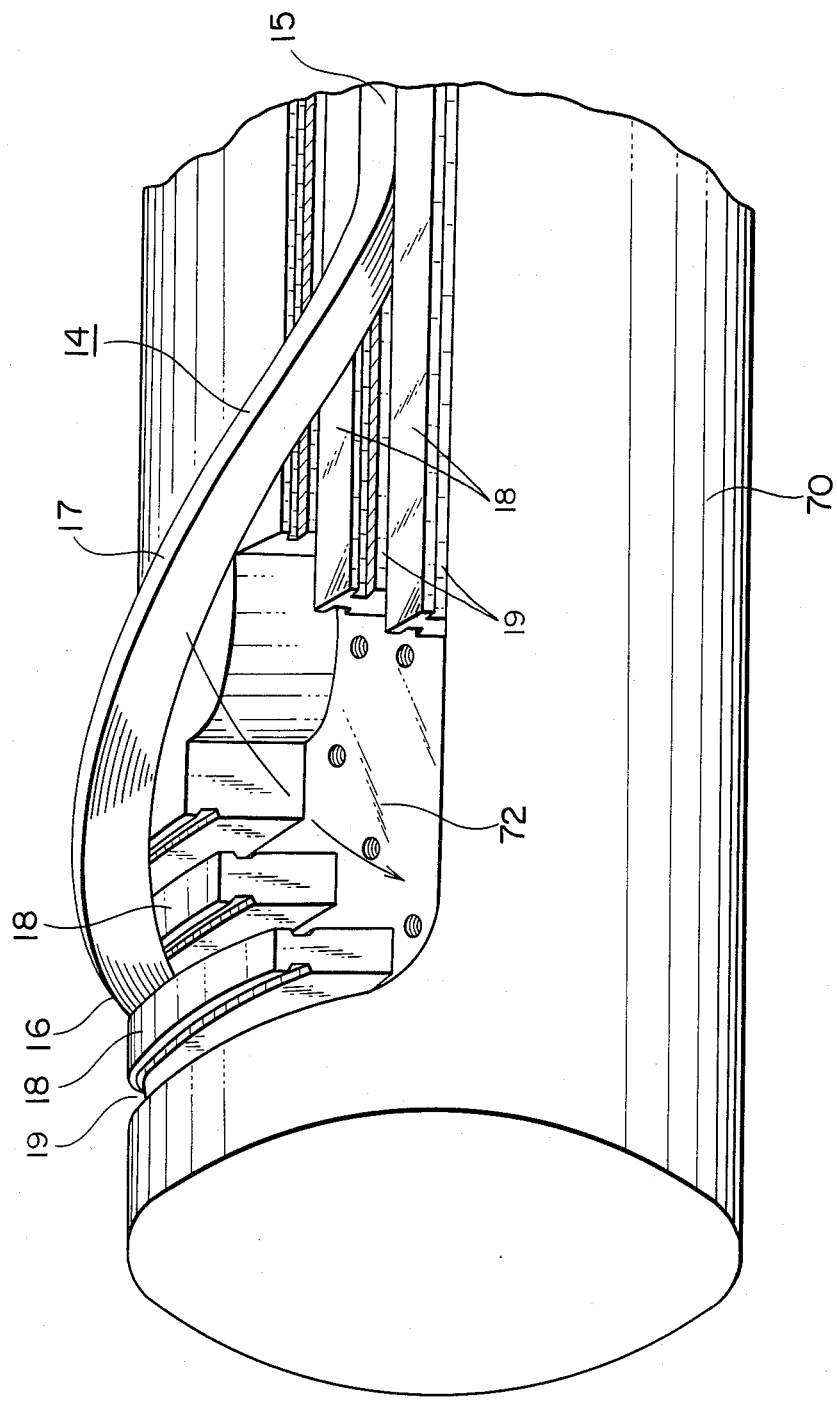
FIG. 15 is a perspective view of the shaft of FIG. 12 showing the manner of installing the field coils into the coil slots in the shaft.
Figure 16:
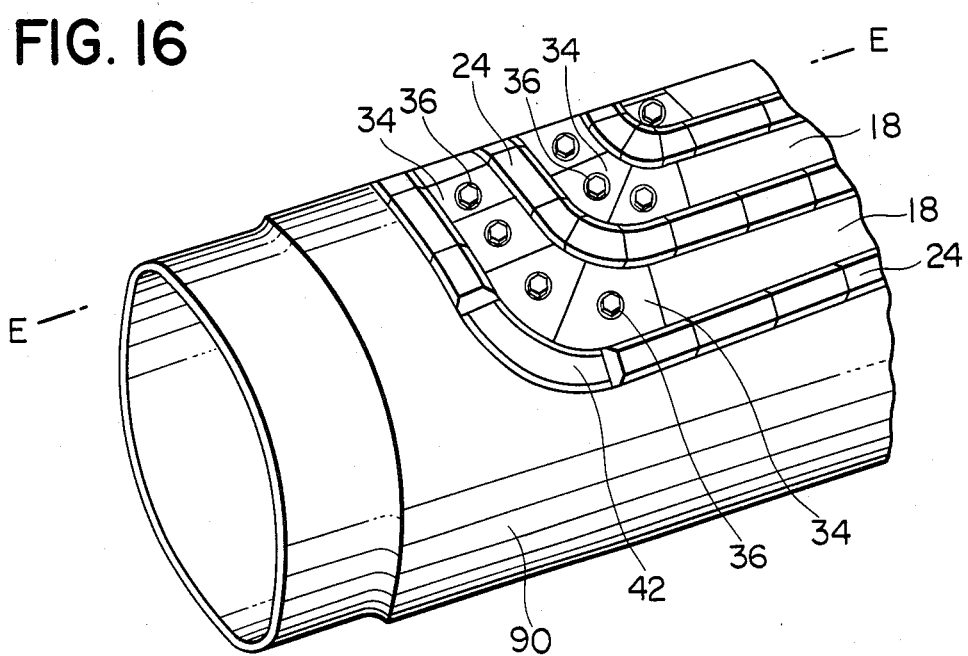
FIG. 16 is a perspective view of one end of a coil-carrying shaft of a rotor according to a fourth embodiment of the present invention.

FIG. 15 illustrates the manner of inserting a previously-wound field coil 14 into the slots 19 in the shaft 70, the manner being identical with that described with respect to FIG. 8. Because of the provision of the recesses 72 in the teeth 18 of the coil-carrying shaft 70, a previously-wound field coil 14 can be easily housed in the slots 19. Furthermore, even though the recesses 72 are larger in this embodiment than in the previous two embodiments, the support members 74 which are secured in the recesses 72 prevent the sideways movement of the coils 14, and the retaining plates 34 which are secured atop the support members 74 prevent the movement of the wedges 24 and thus restrain the coils 14 against radial movement. As in the previous embodiments, a retaining ring is not necessary, and therefore the inspection and repair of the coils 14 is facilitated.

Figure 17:
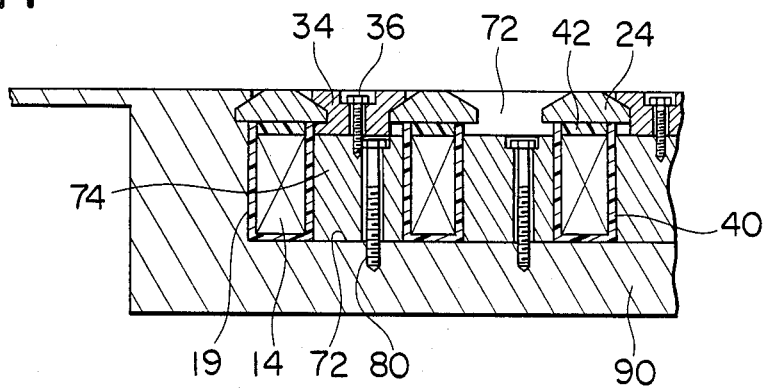
FIG. 17 is a cross-sectional view of the shaft of FIG. 16 taken along Line E—E.
Figure 18:
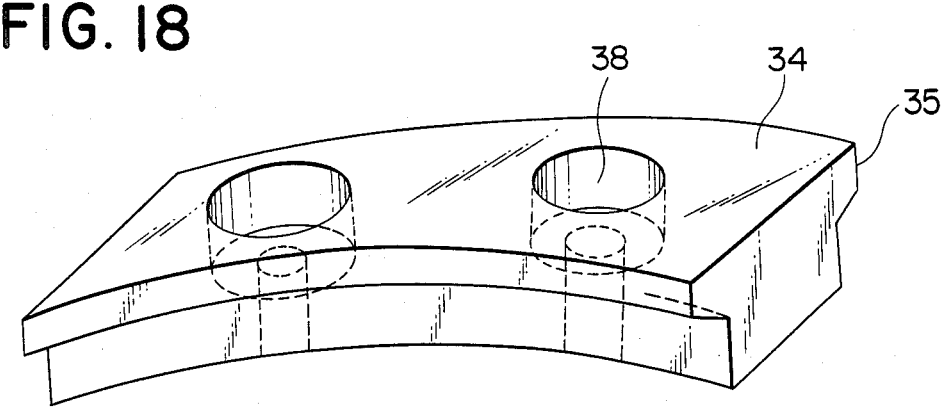
FIG. 18 is a perspective view of one of the retaining members of FIG. 17.
Figure 19:
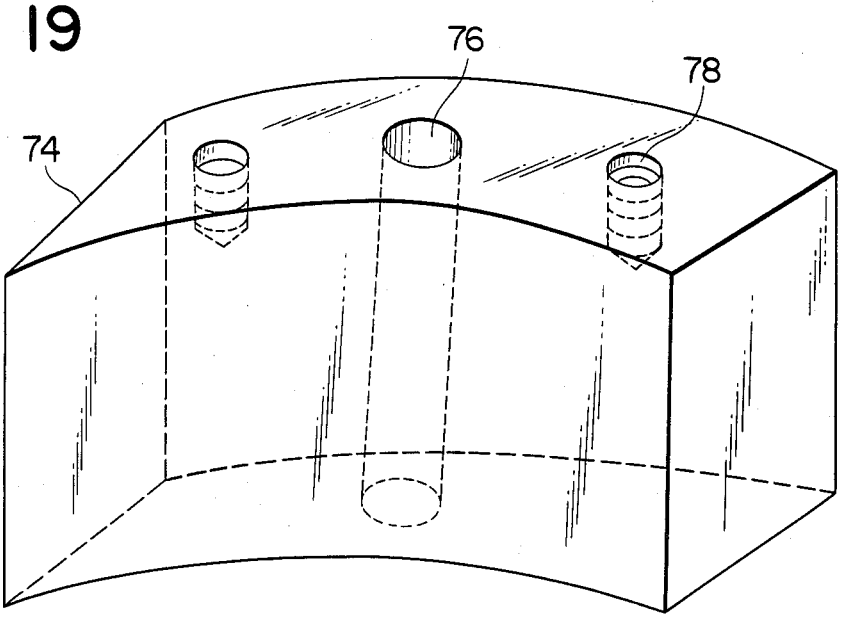
FIG. 19 is a perspective view of one of the support members illustrated in FIG. 17.

FIGS. 16 through 19 illustrate a coil-carrying shaft 90 of a rotor according to a fourth embodiment of the present invention. This embodiment is similar to the previous embodiment except that instead of having recesses 72 formed only in the portions of the teeth 18 adjacent to the corners of the slots 19, the recesses 72 extend over the portions of the teeth 18 adjacent to the arcuate portions of the slots 19 as well. As shown in FIG. 17, which is a cross-sectional view taken along Line E—E of FIG. 16, the recesses 72 in the portions of the teeth 18 adjoining the arcuate portions of the slots 19 have a depth equal to the depth of the slots 19 and extend between adjacent slots 19 so that in effect the arcuate portions and the corners of the coils 14 are housed in a single large circumferentially-extending slot at each end of the coil-carrying shaft 90 instead of in separate slots. As in the previous embodiment, the coils 14 and wedges 24 are prevented from moving by support members 74 secured to the bottom surfaces of the recesses 72 by bolts 80 and retaining plates 34 secured to the top surfaces of the support members 74 by bolts 36. (In FIG. 17, in order to better illustrate the structure, one of the retaining plates 34 of FIG. 16 has been omitted.) The retaining plates 34 and support members 74 may be formed of titanium, a titanium alloy, or the same material as the coil-carrying shaft 90. FIG. 18 illustrates a retaining plate 34. This retaining plate 34 is for use in the arcuate portions of the slots 19. It is basically identical to the retaining plates 34 provided adjacent to the corners of the slots 19, differing only in that it has an arched shape in conformance with the circumferential curvature of the coil-carrying shaft 90 and in that it appears straight in plan view instead of curved like the retaining plate 34 illustrated in FIG. 5. FIG. 19 illustrates a support member 74. This support member 74 is for securing the arcuate portions of the coils 14, and except for having a different curvature is basically the same as the support member 74 for the corners of the coils 14 illustrated in FIG. 14.

As shown in FIG. 17, the support members 74 are detachably secured to the bottom surfaces of the recesses 72 by bolts 80 which screw into screw holes formed in the bottom surfaces of the recesses 72, and the retaining plates 34 are secured to the top surfaces of the support members 74 by bolts 36 which screw into screw holes 78. However, as explained with reference to the previous embodiment, if the bolt holes 38 and 76 are aligned with one another, the retaining plates 34 and the support members 74 can be secured to the recesses 72 and to one another by a single long bolt in each location where a bolt is necessary. The support members 74 completely fill the spaces between adjacent coils 14, leaving no gaps which could allow the coils 14 to move.

As in the previous embodiment, it is desirable that the support members 74 be made of the same material a the coil-carrying shaft 90 so that no gaps will develop between the support members 74 and the adjacent coils 14 upon cooling to the operating temperatures of the rotor.

Figure 20:
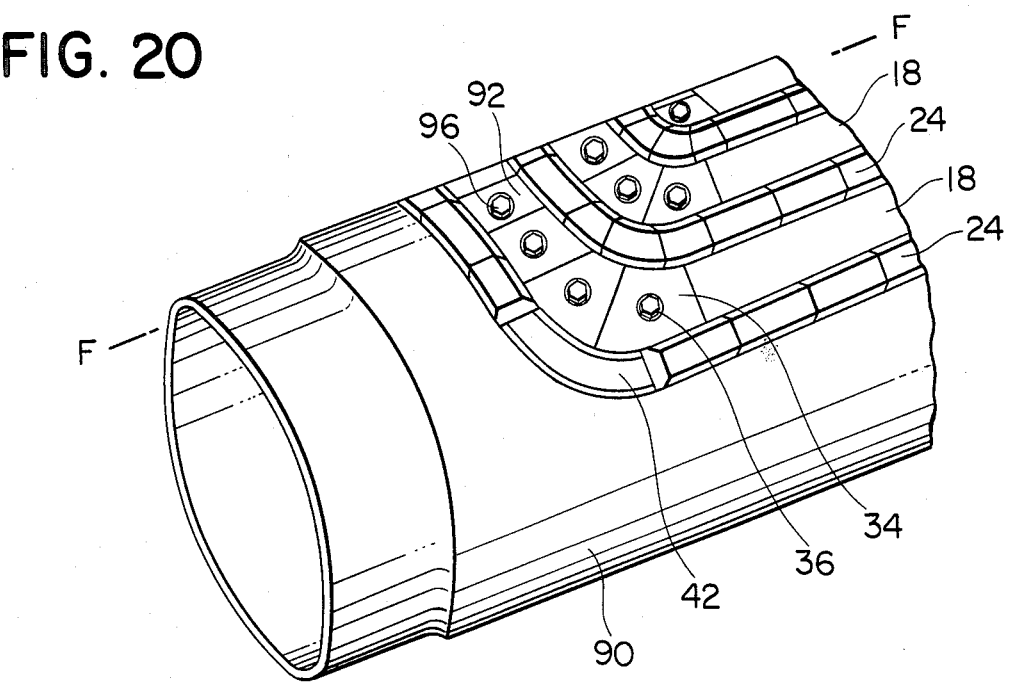
FIG. 20 is a perspective view of one end of a coil-carrying-shaft of a rotor according to a fifth embodiment of the present invention.
Figure 21:
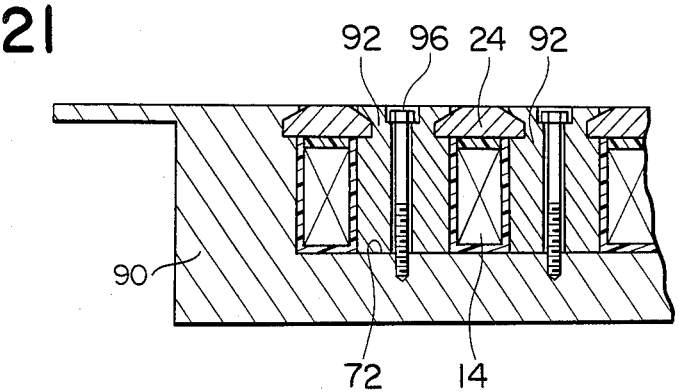
FIG. 21 is a cross-sectional view of the shaft of FIG. 20 taken along Line F—F.
Figure 22:
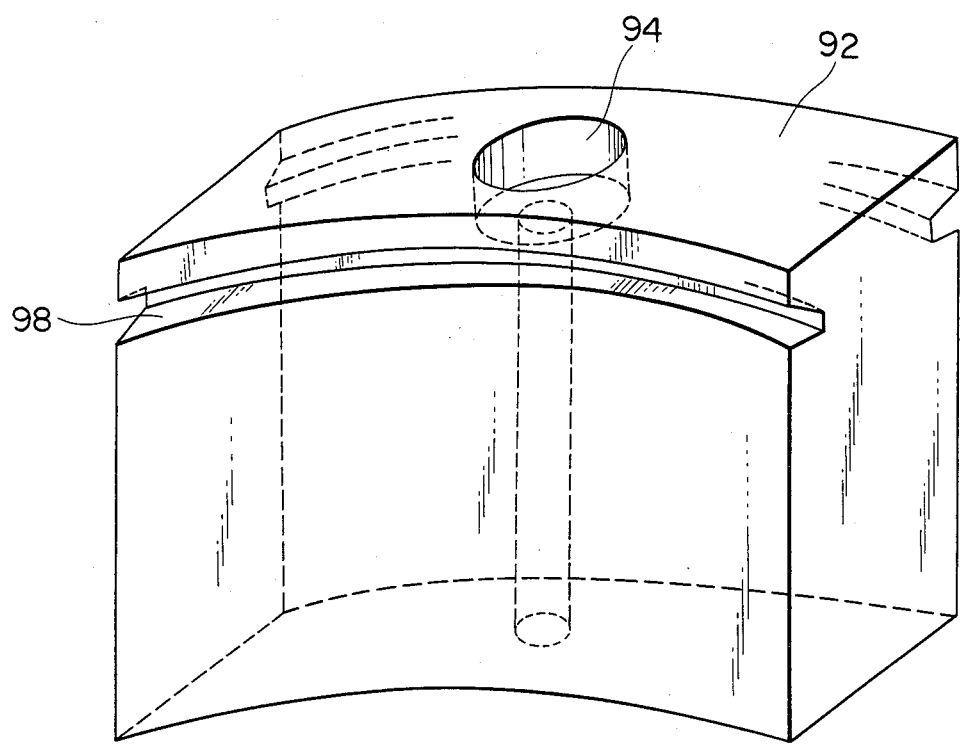
FIG. 22 is a perspective view of one of the retaining members illustrated in FIG. 21.

FIGS. 20 through 22 illustrate a coil-carrying shaft 90 of a rotor according to a fifth embodiment of the present invention. In this embodiment, the means for preventing the movement of the wedges 24 and the field coils 14 are different in the portions of the recesses 72 adjoining the corners and in the portions adjoining the arcuate portions of the coils 14. In the portions adjoining the corners of the coils 14, the movement prevention means comprises retaining plates 34 and support members identical to those used in the previous embodiment. However, in the portions of the recesses 72 adjoining the arcuate portions of the coils 14, the movement prevention means comprises retaining members 92 detachably secured to the bottom surfaces of the recesses 72 by bolts 96. The retaining plates 34, support, members and retaining members 92 may be made of titanium, a titanium alloy, or the some material as the coil-carrying shaft 90. The retaining members 92 extend over the height of both the coils 14 and the wedges 24, and prevent the sideways movement of the coils 14 as well as restrain the wedges 24 and the coils 14 against centrifugal forces. As shown in FIG. 22, each retaining member 92 has a countersunk bolt hole 94 formed therein a bolt 96 passes, through the hold 94 the bolt 96 screwing into a screw hole formed in the bottom surface of the recess 72. Furthermore, wedge grooves 98 extend along both sides of each of the retaining members 92. The edges of the wedges 24 fit into these wedge grooves 98 and are thereby securely held in place. As shown in FIG. 21, which is a cross-sectional view taken along Line F—F of FIG. 20, the dimensions of the retaining members 92 are such that they completely fill the spaces between adjacent coils 14 so that there are no gaps between the retaining members 92 and the coils 14 or between the coils 14 and the sides of the recess 72 so that the coils 14 are prevented from any sideways movement. Since a single retaining member 92 performs the functions of both a support member and a retaining plate, it permits a decrease in the number of parts required to secure the arcuate portions of the coils 14 to the shaft 90.

As with the support members, it is preferable that the retaining members 92 be made of the same material as the coil-carrying shaft 90 so that thermal shrinkage of the support members when they are cooled to the operating temperatures of the rotor will not result in any gaps between the retaining members 92 and the coils 14.

Figure 23:
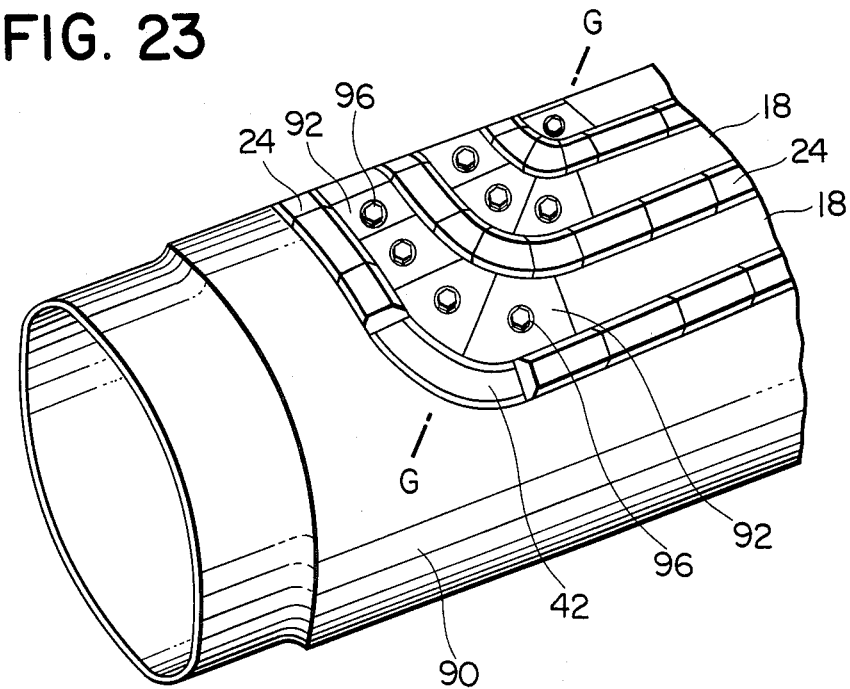
FIG. 23 is a perspective view of one end of a coil-carrying shaft of a rotor according to a sixth embodiment of the present invention.
Figure 24:
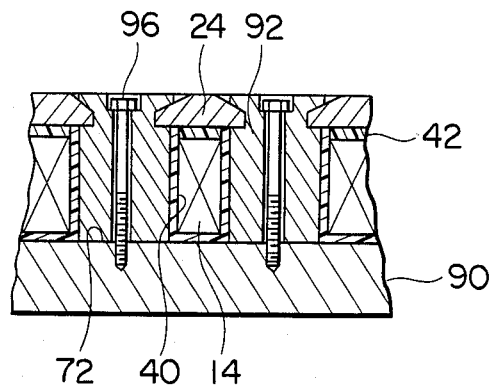
FIG. 24 is a perspective view of the shaft of FIG. 23 taken along Line G—G.

FIGS. 23 and 24 illustrate a coil-carrying shaft 90 of a rotor according to sixth embodiment of the present invention. In this embodiment, the corners of the field coils 14 as well as the arcuate portions are prevented from moving by retaining members 92 like the one illustrated in FIG. 22 which are detachably secured to the bottoms of the recesses 72 by bolts 96 which screw into screw holes formed in the recesses 72. The retaining members 92 may be formed of titanium, a titanium alloy, or the same material as the coil-carrying shaft 90. As shown in FIG. 24, which is a cross-sectional view taken along Line GG of FIG. 23, each of the retaining members 92 is made large enough to completely fill the spaces between adjacent coils 14. As with the retaining members 92 which secure the arcuate portions of the coils 14, the retaining members 92 for the corners of the coils 14 are preferably made of the same material as the coil-carrying shaft 90.

In this embodiment, the structure of the other portions of the coil-carrying shaft 90 is identical to that for the previous embodiment, and therefore cross-sectional views of those portions have been omitted.

During operation of a superconducting rotating electric machine, the rotor rotates at a very high speed, and accordingly the forces which are exerted on the various bolts which secure the retaining plates, support members, and retaining members to the coil-carrying shaft are very high. In order to reduce these forces, it is desirable that the retaining plates, the support members, and the retaining members be made of a metal having a high strength-to-weight ratio so that the weight of these members can be decreased. Titanium or a titanium alloy is particularly suitable for these members, since in addition to its lightness it has a very low coefficient of thermal expansion.

Although in the accompanying drawings the number of retaining plates, support members, and retaining members as well as the number of bolts used to secure these members vary among the embodiments, these numbers can be increased or decreased according to need without influencing the effects provided by the present invention.

As should be clear from the preceding explanation, the provision of recesses in the teeth of a coil-carrying shaft of a rotor for a superconducting rotating machine enables previously-wound field coils to be easily inserted into slots formed in the shaft, and the provision of movement preventing means in the recesses enables the field coils to be rigidly secured in the slots without movement at all temperatures. Accordingly, with the present invention, there is no fear of movement of the coils producing frictional heat and causing a loss of superconductivity. Furthermore, since a retaining ring is not employed in the present invention and since the retaining plates, support members, and retaining members can be easily detached from the coil-carrying shaft when necessary, the inspection and repair of the field coils is greatly facilitated.

What is claimed is:

1. A rotor for a superconducting rotating electric machine comprising:
   a cylindrical coil-carrying shaft having a plurality of parallel coil slots formed in the surface thereof, each of said coil slots having straight portions extending in the longitudinal direction of said shaft, arcuate portions extending in the circumferential direction of said shaft at the ends of said straight portions, and corners which connect the straight portions and the arcuate portions of said slots, said shaft also having a plurality of rotor teeth formed therein whose sides are defined by the sides of said coil slots, each of said rotor teeth having wedge grooves formed therein for the insertion of wedges, each of said rotor teeth having a recess formed therein in at least the portion adjoining the corners of said coil slots;
   a plurality of field coils, each of which is housed in one of said coil slots;
   a plurality of wedges which fit into said wedge grooves in said rotor teeth and fit over said field coils so as to prevent the radial movement of said coils; and
   detachable retaining means for preventing the movement of said wedges and said coils housed in the portions of said coil slots adjoining said recesses.

2. A rotor as claimed in claim 1, wherein:
   said recesses are formed in said teeth adjacent to the corners of said coil slots;
   said recesses are formed in at least one side of each of said teeth and extend between adjacent corners of said slots;
   each of said recesses has a depth less than the depth of said slots; and
   said retaining means comprises retaining plates which are detachably secured to the bottom surfaces of each of said recesses, each of said retaining plates having protruding portions formed in its top portion which fit over the edges of the wedges in the adjacent slots so as to prevent their movement.

3. A rotor as claimed in claim 2, wherein said retaining plates are made of titanium.

4. A rotor as claimed in claim 2, wherein said retaining plates are made of a titanium alloy.

5. A rotor as claimed in claim 1, wherein;
   said recesses are formed in said teeth adjacent to the corners of said coil slots;
   said recesses are formed only on the sides of said teeth which are adjacent to the outsides of said corners of said slots;
   each of said recesses has a depth less than the depth of said slots; and
   said retaining means comprises retaining plates which are detachably secured to the bottom surfaces of said recesses, each of said retaining plates having a protruding portion formed in its top portion which fits over the edge of the wedge in the adjacent slot so as to prevent its movement.

6. A rotor as claimed in claim 5, wherein said retaining plates are made of titanium.

7. A rotor as claimed in claim 5, wherein said retaining plates are made of a titanium alloy.

8. A rotor as claimed in claim 1, wherein:
   said recesses are formed in said teeth adjacent to the corners of said coil slots;
   said recesses are formed in at least one side of each of said teeth and extend between adjacent corners of said slots;
   each of said recesses has a depth equal to the depth of said slots; and
   said retaining means comprises retaining plates and support members, said support members being detachably secured to the bottom surfaces of said recesses and said retaining plates being detachably secured to the top surfaces of said support members, each of said retaining plates having protruding portions formed in its top portion which fit over the edges of the wedges in the adjacent slots so as to prevent their movement, and each of said support members extending between the coils in adjacent coil slots so as to prevent their movement.

9. A rotor as claimed in claim 8, wherein at least one of said retaining plates and said support members is formed of titanium.

10. A rotor as claimed in claim 8, wherein at least one of said retaining plates and said support members is formed of a titanium alloy.

11. A rotor as claimed in claim 8, wherein said support members are formed of the same material as said coil-carrying shaft.

12. A rotor as claimed in claim 1, wherein:
   said recesses are formed in said teeth adjacent to the corners and the arcuate portions of said coil slots;
   said recesses are formed in at least one side of each of said teeth and extend between adjacent slots;
   each of said recesses has a depth equal to the depth of said slots; and
   said retaining means comprises retaining plates and support members, each of said support members being detachably secured to the bottom surface of one of said recesses and each of said retaining plates being detachably secured to the top surface of one of said support members, each of said retaining plates having protruding portions formed in its top portion which fit over the edges of the wedges in the adjacent slots so as to prevent their movement, each of said support members extending between the coils in adjacent coil slots so as to prevent their movement.

13. A rotor as claimed in claim 12, wherein at least one of said retaining plates and said support members is formed of titanium.

14. A rotor as claimed in claim 12, wherein at least one of said retaining plates and said support members is formed of a titanium alloy.

15. A rotor as claimed in claim 12, wherein said support members are formed of the same material as said coil-carrying shaft.

16. A rotor as claimed in claim 1, wherein:
said recesses are formed in said teeth adjacent to the corners and the arcuate portions of said coil slots;
said recesses are formed in at least one side of each of said teeth and extend between adjacent slots;
each of said recesses has a depth equal to the depth of said slots;
in the portions of said recesses adjacent to said corners of said slots, said retaining means comprises retaining plates and support members, said support members being detachably secured to the bottom surfaces of said recesses and said retaining plates being detachably secured to the top surfaces of said support members, each of said retaining plates having protruding portions formed in its top portion which fit over the edges of the wedges in the adjacent slots so as to prevent their movement, and each of said support members extending between the coils in adjacent coil slots so as to prevent their movement: and
in the portions of said recesses adjacent to said arcuate portions of said slots, said retaining means comprises retaining members detachably secured to the bottom surfaces of said recesses and having wedge grooves formed in the top portion thereof into which the wedges in adjoining slots fit and are prevented from movement, each of said retaining members being a single body extending over the height of said wedges and said field coils in the adjacent coil slots.

17. A rotor as claimed in claim 16, wherein at least one of said said retaining members and said support members is made of the same material as said coil-carrying shaft.

18. A rotor as claimed in claim 16, wherein at least one of said retaining plates, said support members, and said retaining members is made of titanium.

19. A rotor as claimed in claim 16, wherein at least one of said retaining plates, said support members, and said retaining members is made of a titanium alloy.

20. A rotor as claimed in claim 1, wherein:
said recesses are formed in said teeth adjacent to the corners and the arcuate portions of said coil slots;
said recesses are formed in at least one side of each of said teeth and extend between adjacent slots;
each of said recesses has a depth equal to the depth of said slots;
in the portions of said recesses adjacent to the arcuate portions and in the portions of said recesses adjacent to the corners of said slots, said retaining means comprises retaining members detachably secured to the bottom surfaces of said recesses and having wedge grooves formed in the top portion thereof into which the wedges in adjoining slots fit and are prevented from movement, said retaining members extending between coils in adjacent coil slots so as to prevent their movement, each of said retaining members being a single body extending over the height of said wedges and said field coils in the adjacent coil slots.

21. A rotor as claimed in claim 19, wherein said retaining members are formed of the same material as said coil-carrying shaft.

22. A rotor as claimed in claim 19, wherein said retaining members are formed of titanium.

23. A rotor as claimed in claim 19, wherein said retaining members are formed of a titanium alloy.

* * * * *